(12) United States Patent
Ogino

(10) Patent No.: US 10,530,956 B2
(45) Date of Patent: Jan. 7, 2020

(54) IMAGE FORMING APPARATUS, READING DEVICE, AND CONTROL METHOD

(71) Applicants: KABUSHIKI KAISHA TOSHIBA, Tokyo (JP); TOSHIBA TEC KABUSHIKI KAISHA, Tokyo (JP)

(72) Inventor: Noboru Ogino, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 15/828,779

(22) Filed: Dec. 1, 2017

(65) Prior Publication Data

US 2019/0174022 A1    Jun. 6, 2019

(51) Int. Cl.
  *H04N 1/04*       (2006.01)
  *H04N 1/207*      (2006.01)
  *H04N 1/00*       (2006.01)
  *H04N 1/10*       (2006.01)

(52) U.S. Cl.
  CPC ......... *H04N 1/207* (2013.01); *H04N 1/00082* (2013.01); *H04N 1/1061* (2013.01)

(58) Field of Classification Search
  CPC ...... H04N 1/04; H04N 1/207; H04N 1/00082; H04N 1/1061
  USPC ........ 358/497, 474; 399/497, 474, 496, 498, 399/380, 379
  See application file for complete search history.

(56) References Cited

U.S. PATENT DOCUMENTS

| | | | | |
|---|---|---|---|---|
| 5,915,691 | A   * | 6/1999  | Deguchi    | G03G 15/605 271/265.01 |
| 6,738,167 | B1  * | 5/2004  | Suzuki     | B65H 3/44 271/9.01 |
| 8,405,845 | B2    | 3/2013  | Nakamura et al. | |
| 9,172,833 | B2  * | 10/2015 | Ishikawa   | H04N 1/00519 |
| 2009/0283960 | A1 * | 11/2009 | Bokelman | B65H 3/0684 271/117 |
| 2014/0071469 | A1 * | 3/2014 | Ishikawa | H04N 1/00519 358/1.12 |
| 2017/0142271 | A1 * | 5/2017 | Kawai     | H04N 1/00623 |
| 2019/0238715 | A1 * | 8/2019 | Takahashi | G06T 5/006 |

* cited by examiner

*Primary Examiner* — Cheukfan Lee
(74) *Attorney, Agent, or Firm* — Kim & Stewart LLP

(57) ABSTRACT

According to one embodiment, an image forming apparatus includes a document platen, a document cover for covering the document platen during scanning, the document cover having a through-hole into which an original document can be inserted for placement on the document platen for scanning while the document cover is covering the document platen, a scanner that scans the original document on the document platen to image data corresponding to the original document, and a printing unit that prints an image of the original document corresponding to the image data obtained by the scanner.

18 Claims, 12 Drawing Sheets

IMAGE FORMING APPARATUS, READING DEVICE, AND CONTROL METHOD

FIELD

Embodiments described herein relate generally to an image forming apparatus, a reading device, and a control method.

BACKGROUND

In the related art, it is possible to copy front and back sides of a card type medium, such as a driver's license, on a sheet of the same size by using an aggregate copy function.

A more advanced machine of recent years is capable of copying the front and back information of the card type medium by one instruction. When this function is executed, a user must place the card type medium at a preset position on the document platen so as to permit the card type medium to be scanned for both the front and back information.

However, when a card is placed on the preset position of the document platen, it is necessary to place the card type medium such that a region outside the card on the document platen will not be scanned. Even when the card is placed such that the outside region will not be scanned, the card may shift due to a wind pressure generated when a platen cover is closed, and, as such, a part of the card type medium may be moved to the outside region. When copying the front and back side of a card is repeated, it is troublesome to repeatedly open and close the platen cover to position and re-position the location of the card.

Therefore, when the function of copying the front and back information of the card type medium is executed, work of the user becomes difficult.

DETAILED DESCRIPTION

In general, according to one embodiment, an image forming apparatus includes a document platen, a document cover for covering the document platen during scanning, the document cover having a through-hole into which an original document can be inserted for placement on the document platen for scanning while the document cover is covering the document platen, a scanner that scans the original document on the document platen to obtain image data corresponding to the original document, and a printing unit that prints an image of the original document corresponding to the image data obtained by the scanner.

Hereinafter, an image forming apparatus, a reading device, and a control method according to an embodiment will be described with reference to the drawings.

Figure 1:
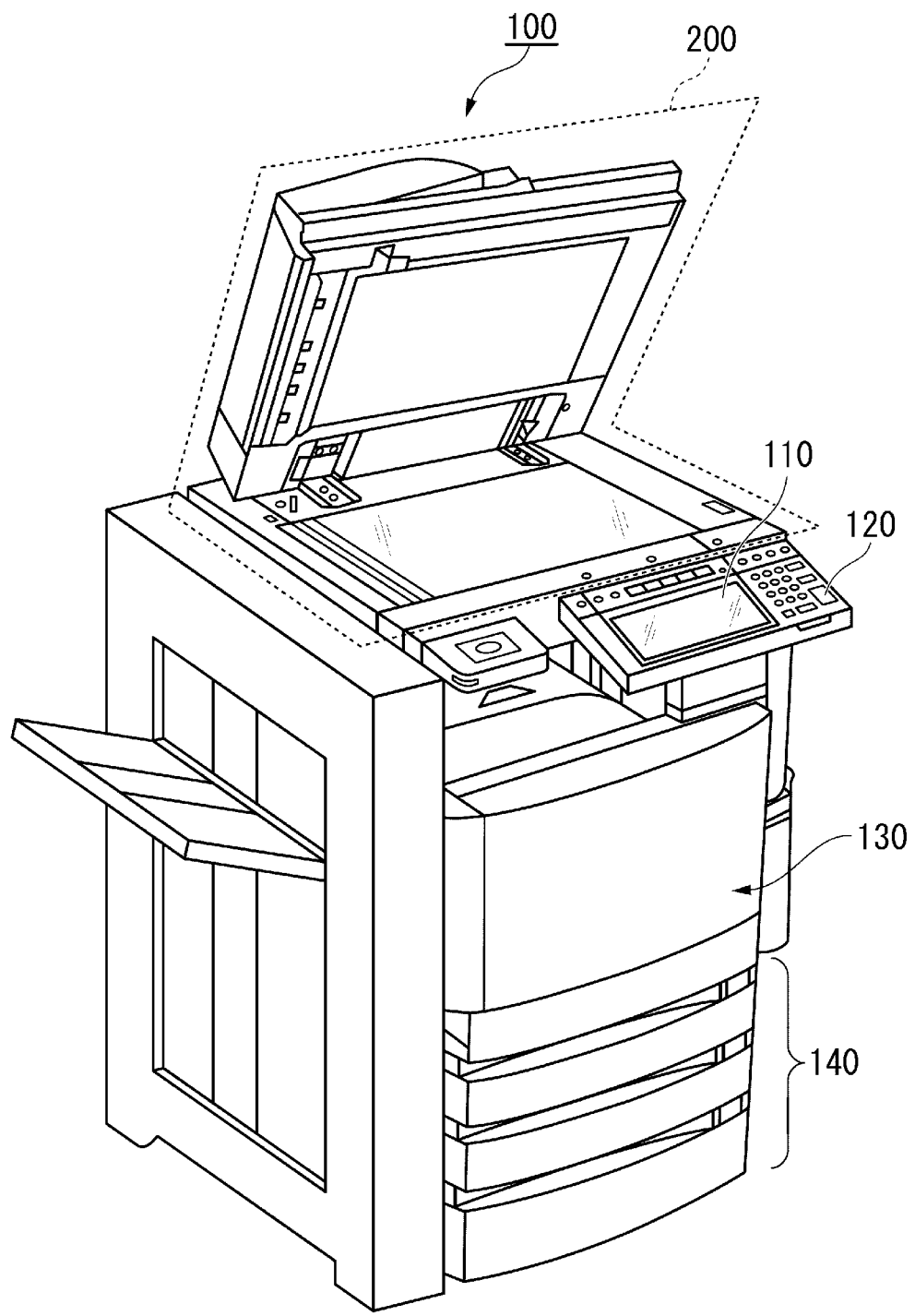
FIG. 1 is an external view of a first example of an image forming apparatus according to an embodiment.

FIG. 1 is an external view of a first example of an image forming apparatus according to the embodiment. An image forming apparatus 100 is, for example, an image forming apparatus such as a multifunctional printer (MFP). The image forming apparatus 100 includes a display 110, a control panel 120, a printer unit 130, a sheet storage unit 140, and an image reading unit 200. The printer unit 130 of the image forming apparatus 100 may be a device for fixing a toner image or may be an ink jet type device.

The image forming apparatus 100 reads an image appearing on a sheet, generates digital data, and generates an image file. The sheet is, for example, paper on which characters, images, or the like have been printed, or the like. In general, the sheet material and shape may be anything as long as the information/images on the sheet can be read by the image forming apparatus 100.

The display 110 is an image display device such as a liquid crystal display or an organic electro luminescence (EL) display. The display 110 displays various types of information related to the image forming apparatus 100.

The control panel 120 has a plurality of buttons. The control panel 120 receives instructions from a user via the buttons. The control panel 120 outputs a signal corresponding to an instruction from a user to an information processing unit of the image forming apparatus 100. Moreover, the display 110 and the control panel 120 may be configured as an integral touch panel. Hereinafter, a case where the display 110 and the control panel 120 are configured as the integral touch panel will be described.

The printer unit 130 forms an image on a sheet based on image information generated by the image reading unit 200 or image information received via a communication path. The printer unit 130 forms an image, for example, as follows. An image forming unit of the printer unit 130 forms an electrostatic latent image on a photoconductive drum based on the image information. The image forming unit of the printer unit 130 forms a visible image by attaching a developer to the electrostatic latent image. The developer may be, for example, a toner. A transfer unit of the printer unit 130 transfers the visible image onto a sheet. A fixing unit of the printer unit 130 fixes the visible image to the sheet by heating and pressing the sheet. The sheet on which an image is formed may be a sheet stored in the sheet storage unit 140 or may be a sheet delivered by hand.

The sheet storage unit 140 stores sheets to be used for forming an image in the printer unit 130.

The image reading unit 200 reads the image information on the sheet as a brightness of light reflected from the sheet at various positions or the like. The image reading unit 200 records the image information that has been read. The recorded image information may later be used in forming an image on a sheet with the printer unit 130. The image reading unit 200 includes a document cover that holds a document to read disposed on a document surface glass (also referred to as a document platen). The image reading unit 200 includes an auto document feeder (ADF) that can be detached. The ADF feeds the document automatically.

In the image forming apparatus 100 according to the embodiment, a part of a pressing plate of the document cover can be detached. Hereinafter, this part of the pressing plate of the document cover is also referred to as a "detachable pressing plate". The detachable pressing plate has a rectangular shape. If the detachable pressing plate is detached, a through-hole is formed in a document cover 400. The size of the through-hole is slightly larger than a size of a card type medium (hereinafter, referred to as "ID card") such as a driver's license, a passport, a health insurance card, or an ID card called here a "My Number" card in some instances. Specifically, the size of the through-hole is set to be larger than an outer periphery of an ID card to be copied by about 1 mm.

When double sided copying of an ID card C is not being performed, the detachable pressing plate may be attached to the document cover for manual single sided copying. Instead, a document cover having a detachable pressing plate and a document cover not having a detachable pressing plate may be both prepared. In this case, when double sided copying of an ID card C is not being performed, the document cover not having a detachable pressing plate is used.

It is also possible to attach a detachable pressing plate to the document cover when double sided copying of a ID card C is not being performed. However, there is a concern that the rectangular shape of the detachable pressing plate may be scanned partially. It is possible to improve the scanned image quality by using the document cover not having the detachable pressing plate.

When double sided copying of an original document such as the ID card C is being performed, the detachable pressing plate is detached such that the document cover is placed on the document platen. The document is placed at a portion of the document platen exposed through the through-hole by detaching the detachable pressing plate prior to a start of the double sided copying. Hereinafter, a case where an ID card C, as an example of the original document, is printed will be described.

Figure 2:
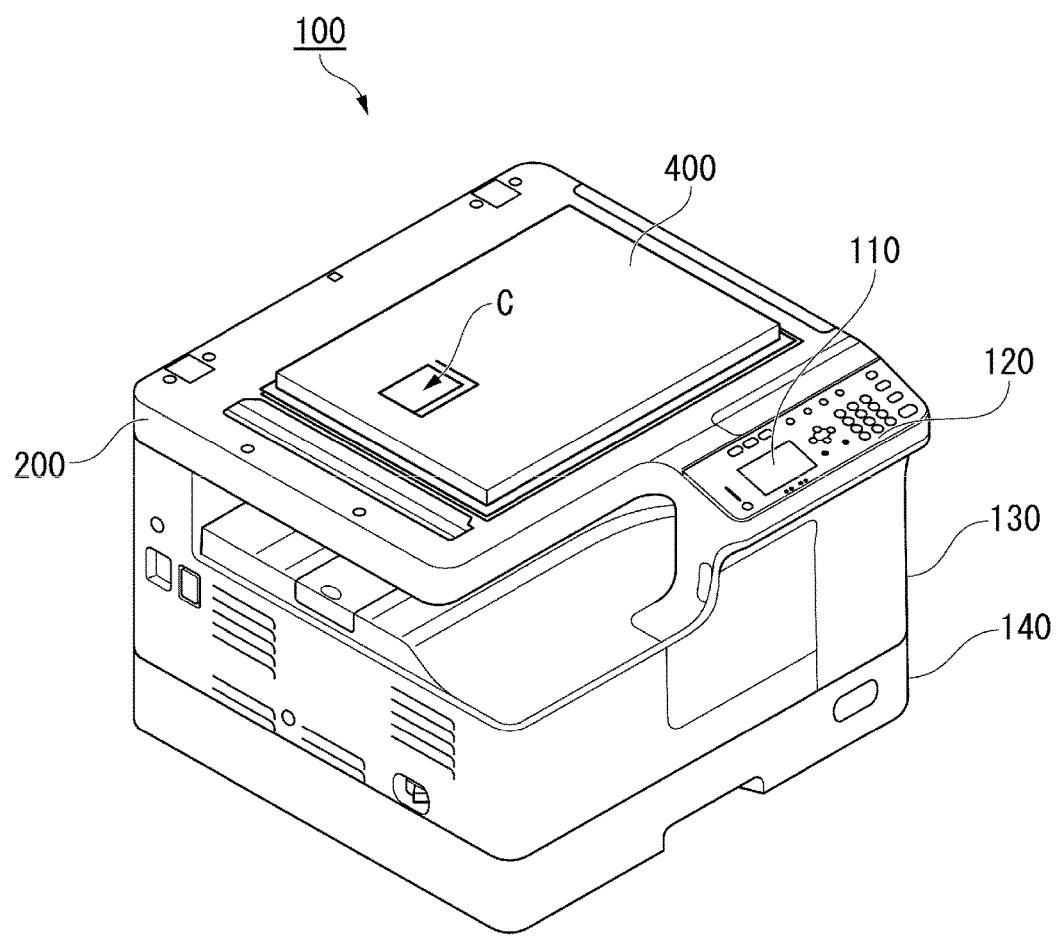
FIG. 2 is an external view of a second example of an image forming apparatus according to the embodiment.

FIG. 2 is an external view of a second example of an image forming apparatus according to the embodiment. In the image forming apparatus depicted in FIG. 2, the original document is inserted into the through-hole while a document cover 400 is placed on the document platen and an ADF is removed.

Here, a plurality of types of the document covers 400 may be prepared according to the type of the original document. Specifically, the plurality of types of the document covers 400 are prepared according to the expected size of the ID card C. The document cover 400 to be used is selected according to the original document to be printed and the selected document cover 400 is attached to the ADF. However, if a double sided printing of the ID card C is not being performed, the document cover 400 not having a detachable pressing plate is selected and the selected document cover 400 is attached to the ADF.

Figure 3:
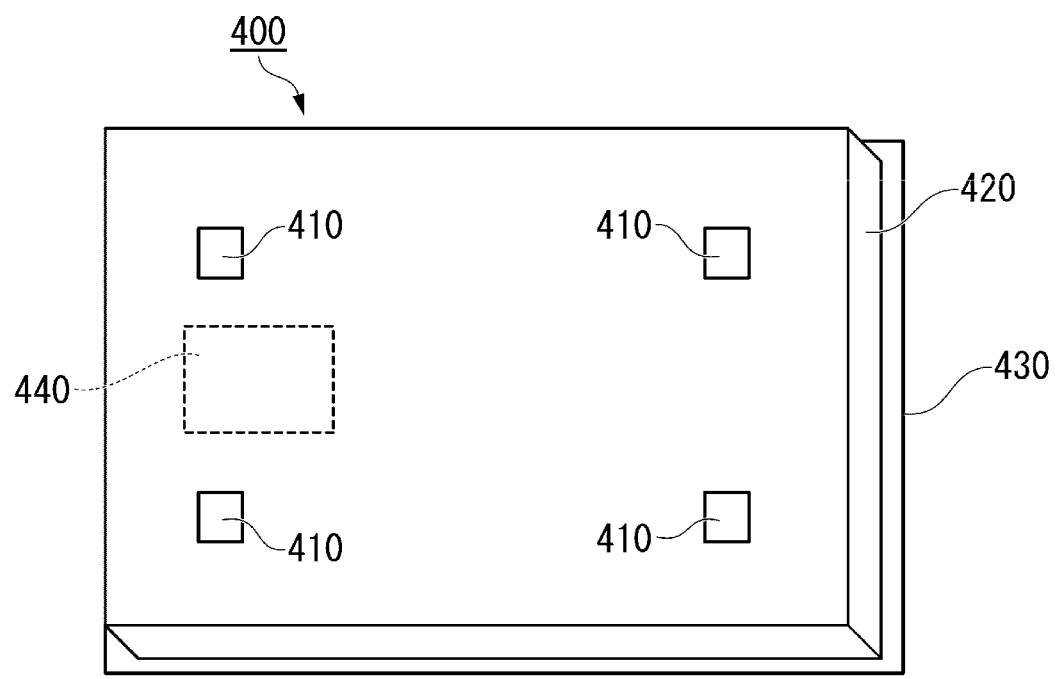
FIG. 3 is a schematic view of a first example of a document cover of an image forming apparatus according to the embodiment.

FIG. 3 is a schematic view of a first example of the document cover of the image forming apparatus according to the embodiment.

The document cover 400 includes a white plate 430, an elastic member 420, such as a sponge, formed on a surface opposite to a surface of the white plate 430, with which the document platen is in contact when the document cover 400 is closed, and an attaching and detaching member 410 such as Velcro 410 which is formed on a surface opposite to the surface, on which the white plate 430 is formed, of the elastic member 420.

An example of the white plate 430 is made of plastic, has a thickness of a about 1 mm, and has appropriate hardness and weight. The sizes of the document platen (glass) and the white plate 430 are substantially the same. When the white plate 430 is placed on the document platen, the white plate 430 is aligned at a fixed position of the original document. With such a configuration, it is possible to eliminate the work of detecting the position of the through-hole each time a scanning is performed. The elastic member 420 is a cushioning material and has a thickness of about 2.5 mm. In the example illustrated in FIG. 3, the attaching and detaching members 410 are formed at four places of the elastic member 420. The attaching and detaching member 410 is joined to an attaching and detaching member adhered to the ADF, and thereby the document cover 400 functions as a document pressing plate of the ADF. A detachable pressing plate 440 is illustrated in FIG. 3.

Figure 4:
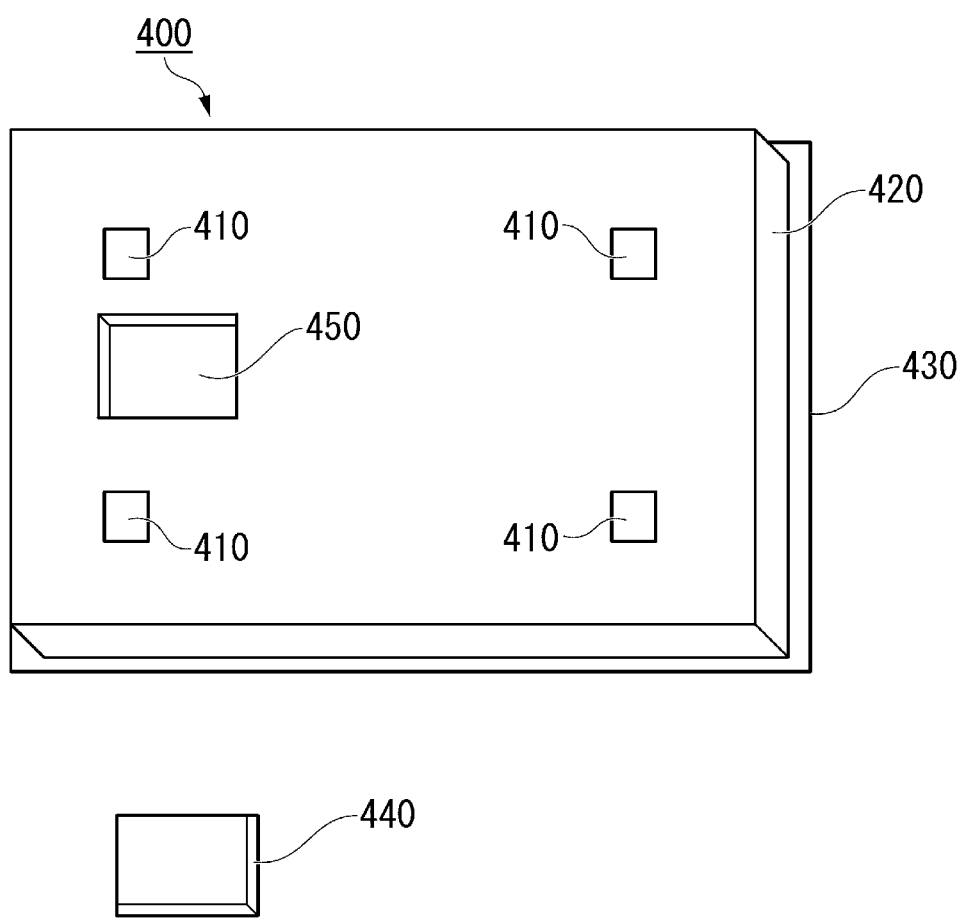
FIG. 4 is a schematic view of a second example of a document cover of an image forming apparatus according to the embodiment.

FIG. 4 is a schematic view of a second example of a document cover of the image forming apparatus of the embodiment.

FIG. 4 illustrates a state where the detachable pressing plate 440 is detached in the document cover 400 illustrated in FIG. 3.

As described above, the detachable pressing plate 440 is slightly larger in size than the ID card. The detachable pressing plate 440 can be detached from and attached to the document cover 400.

Figure 5:
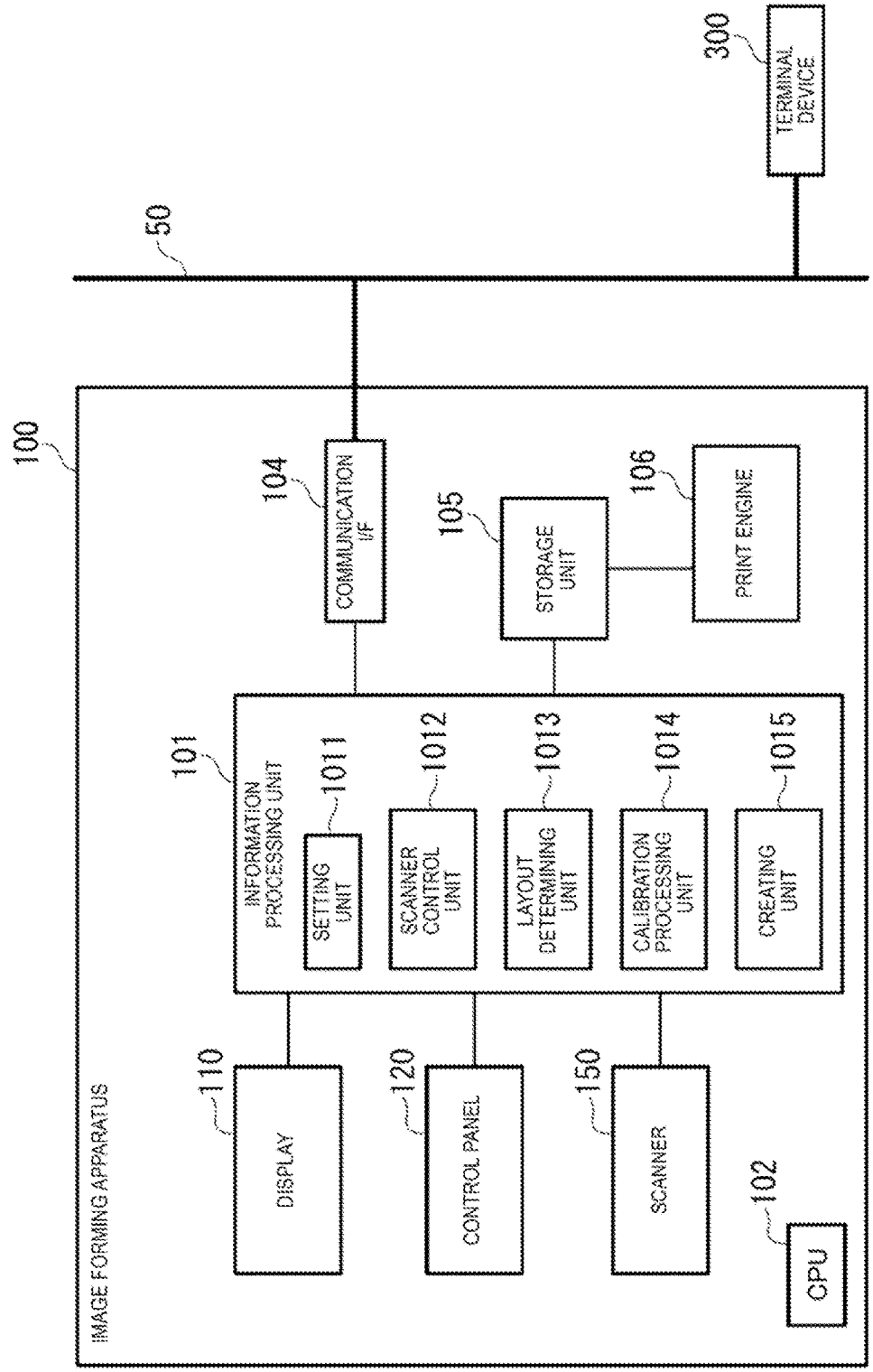
FIG. 5 is a functional block diagram of an image forming apparatus according to the embodiment.

FIG. 5 is a functional block diagram of the image forming apparatus according to the embodiment.

The image forming apparatus 100 includes a Central Processing Unit (CPU) 102, a memory, an auxiliary storage device, or the like which are connected to each other with bus, and executes a control program. The image forming apparatus 100 functions as an apparatus including the display 110, the control panel 120, a scanner 150, and an information processing unit 101, a communication I/F 104, a storage unit 105, and a print engine 106 by executing the control program.

All or a part of each function of the image forming apparatus 100 may be realized by using hardware such as an Application Specific Integrated Circuit (ASIC), a Programmable Logic Device (PLD), or Field Programmable Gate Array (FPGA). The control program may be recorded on a computer readable recording medium. The control program may be transmitted via an electric communication line.

The CPU 102 is an arithmetic device that provides each function of the image forming apparatus 100 by reading and executing programs and data stored in the storage unit 105 or the like on a RAM.

The display 110 displays a processing result output by the information processing unit 101 or the like.

The control panel 120 is an input device operated by a user. For example, the control panel 120 is a display input device such as a touch panel display. In this case, the display 110 and the control panel 120 are integrated.

Figure 6:
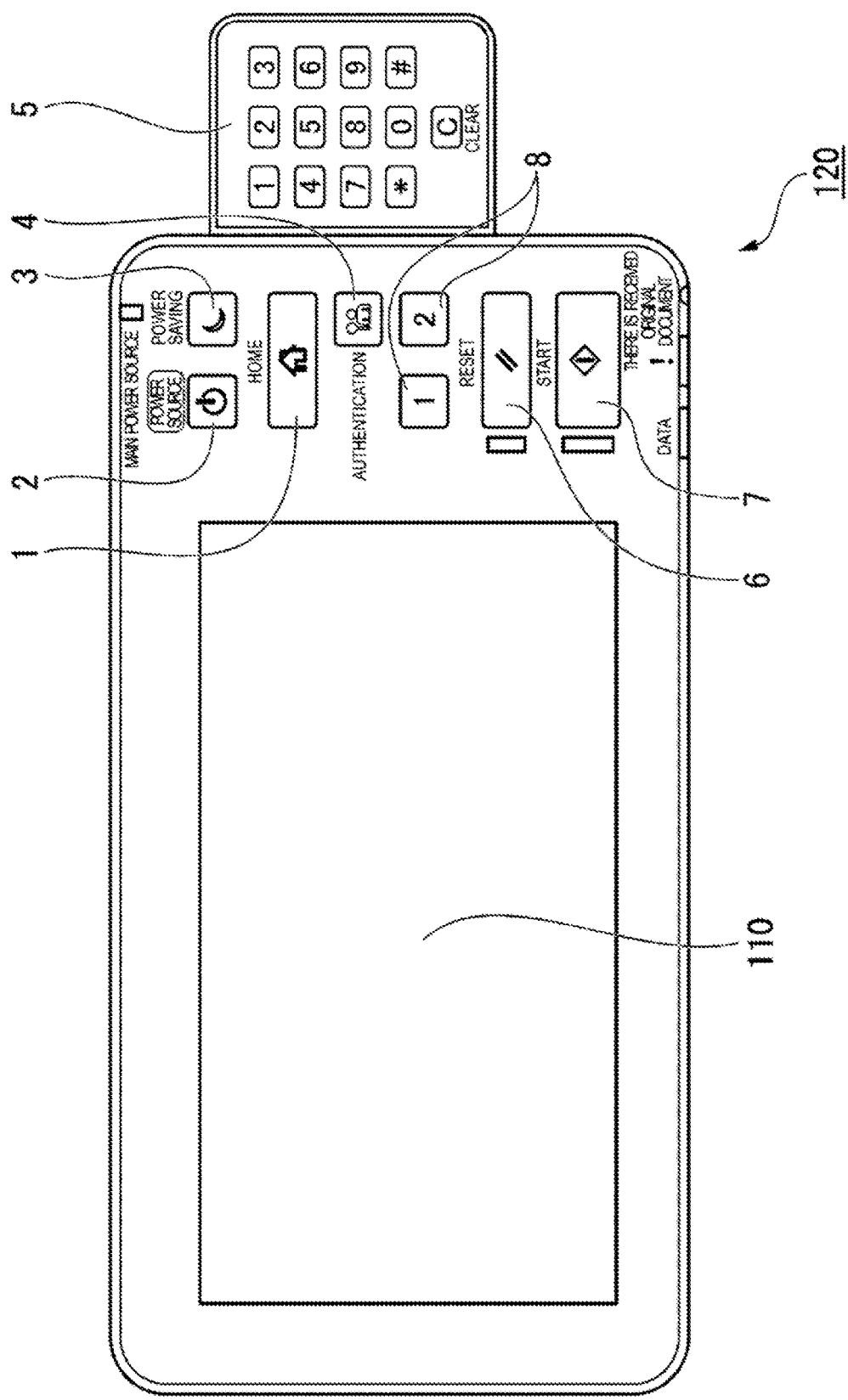
FIG. 6 is a view of a control panel of an image forming apparatus according to the embodiment.

FIG. 6 is a view illustrating an example of a control panel of the image forming apparatus according to the embodiment. FIG. 6 illustrates the display 110 in addition to the control panel 120. The control panel 120 includes a home button 1, a power source button 2, a power saving button 3, an authentication button 4, a numeric key pad 5, a reset button 6, a start button 7, and function buttons 8.

The home button 1 is pressed when displaying a home screen on the display 110. The power source button 2 is pressed when turning on or off power supply of the image forming apparatus 100. The power saving button 3 is pressed when shifting the image forming apparatus 100 from a normal mode to a power saving mode, or returning the image forming apparatus 100 from the power saving mode to the normal mode.

The authentication button 4 is pressed when logging in to the image forming apparatus 100. The user pushes the authentication button 4 and thereby an authentication screen is displayed on the display 110. The authentication screen includes a box for inputting a user ID and a box for inputting a password. The user inputs the user ID in the box for inputting the user ID and inputs the password in the box for inputting the password by using the numeric key pad 5 which is described later or the like. The control panel 120 outputs a combination of the user ID and the password input by the user to the information processing unit 101. The information processing unit 101 authenticates the user based on the combination of the user ID and the password output by the control panel 120, and outputs an authentication result to the control panel 120.

The numeric key pad 5 is pressed when inputting numbers or the like. The reset button 6 is pressed when releasing all the selected functions and returning the functions to initial setting. The start button 7 is pressed when starting an operation of copying or the like. The function buttons 8 are registered with frequently used functions. The function button 8 is pressed when calling the registered function.

Figure 7:
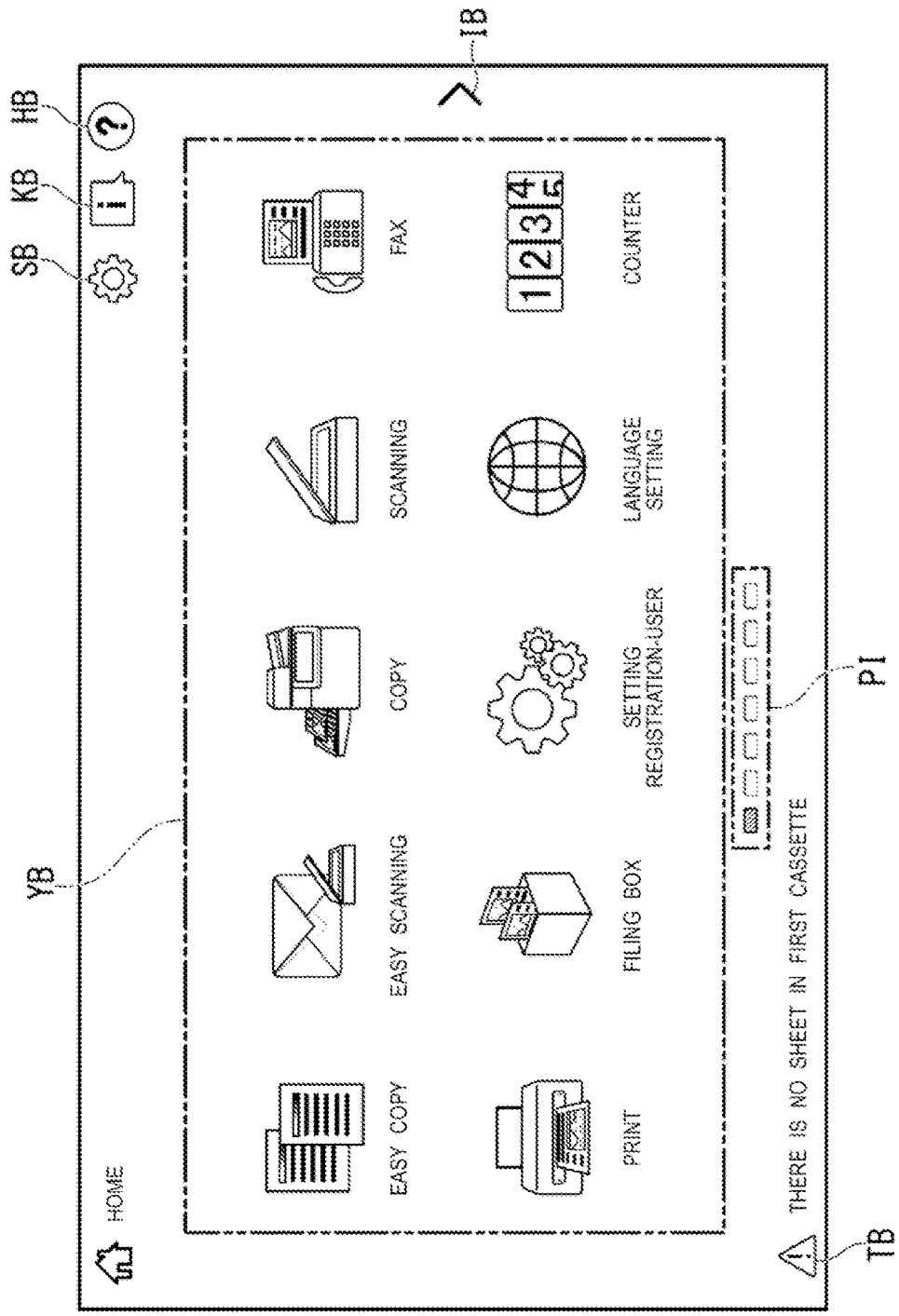
FIG. 7 is a view of a home screen of an image forming apparatus according to the embodiment.

FIG. 7 is a view of an example of the home screen of an image forming apparatus according to the embodiment. As described above, the home screen is displayed on the display 110.

A call button YB, a setting button SB, a status confirmation button KB, a help button HB, a page movement button IB, a page position button PI, and a state notification button TB are displayed on the home screen.

The call button YB is pressed when registering a function, a template, a URL, or the like and calling the registered function, the template, the URL, or the like. Specifically, the call button YB includes a plurality of icons and the function, the template, the URL, or the like is registered in each of the plurality of the icons. The functions registered in the icons include a function of printing images of both sides of the ID card C on one sheet. The user activates the function registered in an icon in the image forming apparatus 100 by pressing any one icon of the plurality of the icons. Hereinafter, a case where the user presses the icon corresponding the function of continuous double sided printing of the ID card C on one sheet (hereinafter, referred to as a "continuous mode") will be described.

When the user selects the continuous mode, the control panel 120 outputs information indicating the continuous mode has been selected to the information processing unit 101.

The control panel 120 displays selections of a layout in which the images of both sides of the ID card C are disposed on the display 110.

Figure 8:
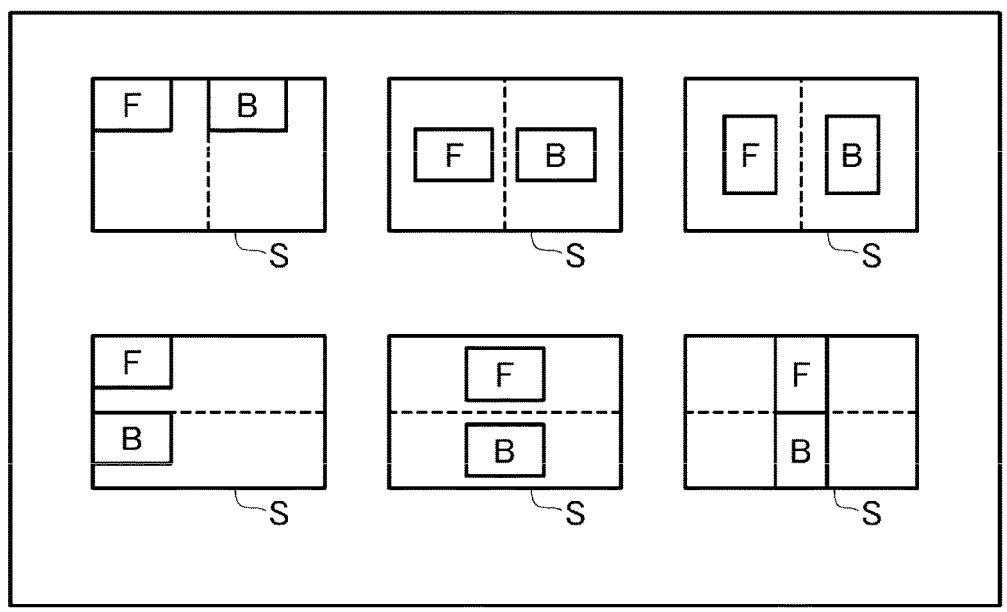
FIG. 8 is a view of selections of a layout displayed on a display.

FIG. 8 is a view illustrating an example of selections of a layout displayed on the display. In the example illustrated in FIG. 8, six selections of a layout of a front side F and a back side B of a ID card on a sheet S are displayed.

The user selects one of the displayed selections of a layout, and presses a portion of the selected layout on the display. Information indicating the layout registered in the portion pressed on the layout is output to the information processing unit 101.

Figure 9:
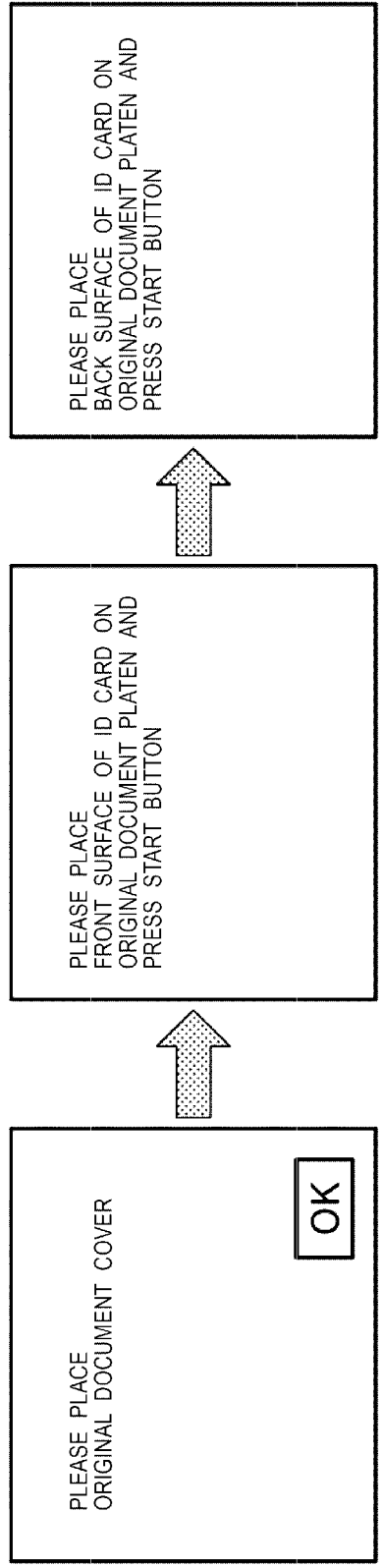
FIG. 9 is a view of operation instructions displayed on a display.

FIG. 9 is a view illustrating an example of operation instructions displayed on a display.

After the selection of the layout is performed by the user, the control panel 120 displays a message such as "please place the document cover" on the display 110. In response to the message, the user places the document cover 400 on the document platen. The user presses a portion on the display 110 which displays "OK" or the like.

If the control panel 120 detects that the portion on the display which displays "OK" is pressed, the control panel 120 displays a message such as "please place the front side of the ID card on the document platen and press the start button" on the display 110. In response to the message, the user places the front side of the ID card C on the document platen, and presses the start button 7. The front side of the ID card C is copied.

When copying of the front side of the ID card C has been completed, the control panel 120 displays a message such as "please place the back side of ID card on the document platen and press the start button" on the display 110. In response to the message, the user places the back side of the ID card C on the document platen, and presses the start button 7. The back side of the ID card C is copied.

The setting button SB is pressed to change the setting of the home screen. The status confirmation button KB is pressed to confirm a process status or an execution history of a job. The help button HB is pressed to display a help screen of each function. The page movement button IB is pressed to scroll to a next page. The page position button PI displays a current page position. The state notification button TB displays when there is information to be notified by the image forming apparatus 100.

Referring back to FIG. 5, the scanner 150 scans the ID card C placed on the document platen according to a control signal output by the information processing unit 101. The scanner 150 generates image information by scanning the ID card C and outputs the generated image information to the information processing unit 101.

The information processing unit 101 is connected to the display 110, the control panel 120, and the scanner 150. A part or all of the information processing unit 101 is a functional unit, referred to as a "software functional unit" hereinafter, realized by executing a program stored in the storage unit 105 by a processor such as the CPU 102. A part or all of the information processing unit 101 may be realized by hardware such as an LSI, an ASIC, or an FPGA, or may be realized by a combination of the software functional unit and hardware.

The information processing unit 101 includes, for example, a setting unit 1011, a scanner control unit 1012, a layout determining unit 1013, a calibration processing unit 1014, and a creating unit 1015.

The setting unit 1011 sets an operation image reading position depending on the size of the through-hole appearing on the document cover 400 when the detachable pressing plate 440 is detached from the document cover 400. When the detachable pressing plate 450 is detached from the document cover 400 while the document cover 400 is placed on the document platen, a position such as a coordinate of a portion exposed through the through-hole appearing on the document cover 400 is known. Here, the coordinate refers to a coordinate on the document platen.

The scanner 150 scans the ID card C while illuminating the ID card C placed on the document platen with light from below, and generates the image information. Therefore, if a range scanned by the scanner 150 is set to be the same size as that of the through-hole and a corner of the through-hole is in contact with the ID card C, image information of a shadow of the through-hole is included in the image information. If the range scanned by the scanner 150 is set to be the same size as that of the through-hole, since the size of the through-hole is slightly larger than the size of the ID card C, a gap portion is present between the ID card C and the through-hole, and the gap portion is exposed. Therefore, there is a concern that a black streak image due to the exposed gap portion is included in the image information. Therefore, the setting unit 1011 sets the scanning range of the scanner 150 to be slightly narrower than the through-hole in order to prevent the image information of the shadow of the through-hole or the black streak from being included.

Figure 10:
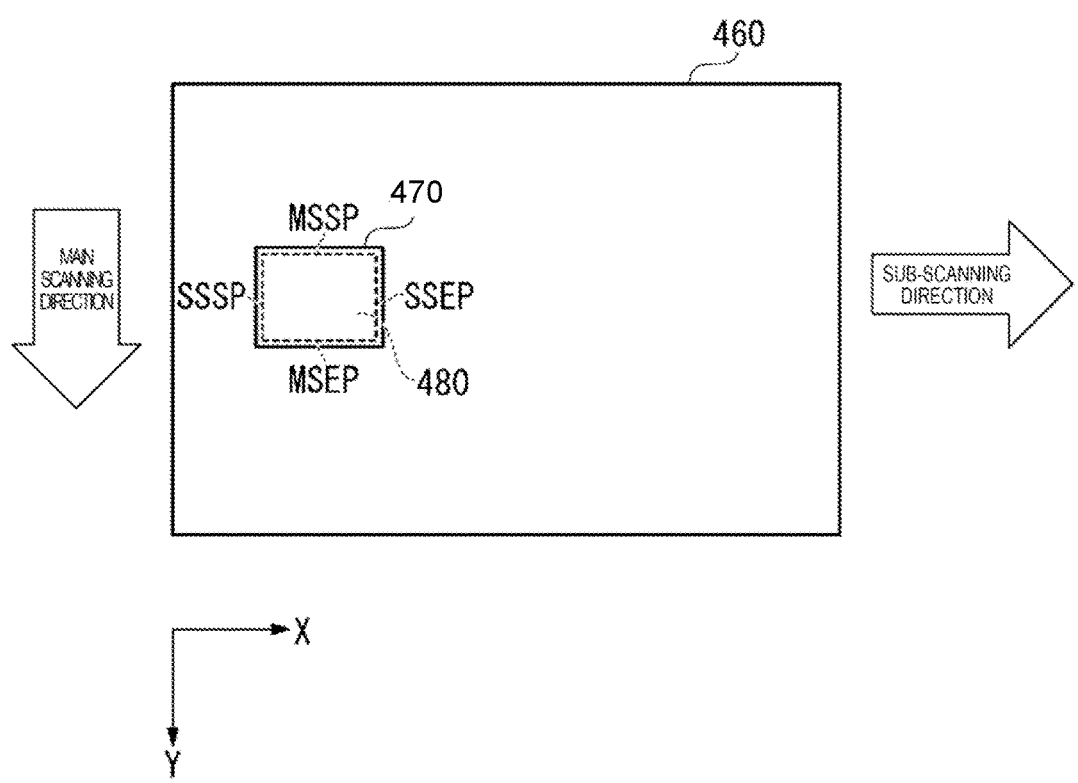
FIG. 10 is a view of a scanning range of an image forming apparatus according to the embodiment.

FIG. 10 is a view of a scanning range of the image forming apparatus according to the embodiment. FIG. 10 illustrates a region 470 of the through-hole and a scanning region 480 on a document platen 460. The scanning region 480 is slightly narrower than the region 470 of the through-hole. The document platen 460 has a rectangular shape. A lateral direction of the document platen 460 is a main scanning direction and a longitudinal direction is a sub-scanning direction. The through-hole has also a rectangular shape. A side of the through-hole in the longitudinal direction is parallel to a side of the document platen 460 in the longitudinal direction and a side of the through-hole in the lateral direction is parallel to a side of the document platen 460 in the lateral direction.

The setting unit 1011 sets the scanning range of the scanner 150. The setting unit 1011 sets a main scanning start position MSSP that is a position at which the main scanning is started and a main scanning end position MSEP that is a position at which the main scanning is ended in the main scanning direction. The setting unit 1011 sets a sub-scanning start position SSSP that is a position at which the sub-scanning is started and a sub-scanning end position SSEP that is a position at which the sub-scanning is ended in the sub-scanning direction.

Specifically, in the main scanning direction, a direction from the main scanning start position MSSP to the main scanning end position MSEP is referred to as a Y axis. In the sub-scanning direction, a direction from the sub-scanning start position SSSP to the sub-scanning end position SSEP is referred to as an X axis. In this case, the setting unit 1011 sets a position obtained by adding a length of substantially 1 mm to the position at which the through-hole is started in the main scanning direction as the main scanning start position MSSP. That is, the setting unit 1011 sets a position where the position at which the through-hole is started plus substantially 1 mm in the Y-axis direction as the main scanning start position MSSP. The setting unit 1011 sets a position obtained by subtracting a length of substantially 2 mm from the position at which the through-hole is ended in the main scanning direction as the main scanning end position MSEP. That is, the setting unit 1011 sets the position where the position at which the through-hole is ended minus substantially 2 mm in the Y-axis direction as the main scanning end position MSEP.

The setting unit 1011 sets a position obtained by adding a length of substantially 1 mm to the position at which the through-hole is started in the sub-scanning direction as the sub-scanning start position SSSP. That is, the setting unit 1011 sets a position where the position at which the through-hole is started plus about 1 mm in the X-axis direction as the sub-scanning start position SSSP. The setting unit 1011 sets a position obtained by subtracting a length of about 2 mm from the position at which the through-hole in the sub-scanning direction is ended as the sub-scanning end position SSEP. That is, the setting unit 1011 sets the position where the position at which the through-hole is ended minus about 2 mm in the X-axis direction as the sub-scanning end position SSEP.

The setting unit 1011 outputs information indicating the main scanning start position MSSP, information indicating the main scanning end position MSEP, information indicating the sub-scanning start position SSSP, information indicating the sub-scanning end position SSEP, which are set, to the scanner control unit 1012.

The scanner control unit 1012 controls the scanner 150 based on the information indicating the main scanning start position MSSP, the information indicating the main scanning end position MSEP, the information indicating the sub-scanning start position SSSP, and the information indicating the sub-scanning end position SSEP which are output by the setting unit 1011. Specifically, the scanner control unit 1012 reads an image between the main scanning start position and the main scanning end position with a sensor while moving the sensor from the sub-scanning start position to the sub-scanning end position. The scanner control unit 1012 acquires the image information output by the scanner 150 and outputs the acquired image information to the creating unit 1015.

As illustrated in FIG. 8, the layout determining unit 1013 displays the selections of a layout for disposing the images of both sides of the ID card C on the display 110 when acquiring the information indicating the continuous mode output by the control panel 120. The layout determining unit 1013 acquires the information indicating the layout output by the control panel 120 and determines the layout based on the acquired layout information. The layout determining unit 1013 outputs the information indicating the determined layout to the creating unit 1015.

The calibration processing unit 1014 calibrates the position of the through-hole with respect to the document platen. When the detachable pressing plate 450 is detached from the document cover 400 while the document cover 400 is placed on the document platen, the position of the portion exposed through the through-hole appearing on the document cover 400 is known. Therefore, when the user copies the ID card C, it is not necessary to input the coordinate of the position of the portion exposed through the through-hole. However, it is assumed that some misalignment will occur depending on a dimensional error of a component or a position of the white plate 430 of the document cover 400 placed by the user on the document platen. In addition, it is assumed that the position of the portion exposed through the through-hole appearing on the document cover 400 is shifted as the image forming apparatus 100 has been used for a long period of time. Therefore, the calibration processing unit 1014 calibrates the position of the portion exposed through the through-hole appearing on the document cover 400.

The calibration is performed prior to the selection of the continuous mode and the start of the copying of the ID card C by the user.

The calibration processing unit 1014 displays a message such as "please place the document cover" on the display 110. In response to the message, the user places the document cover 400 on the document platen. The user presses the portion on the display 110 which displays "OK" or the like.

The calibration processing unit 1014 displays a message such as "please detach the detachable pressing plate from the document cover" on the display 110 when detecting that the portion which displays "OK". The user detaches the detachable pressing plate 450 from the document cover 400 with reference to the display. The user presses the portion which displays "OK" on the display 110.

The calibration processing unit 1014 causes the scanner 150 to execute full-size scanning by controlling the scanner 150 when detecting that the portion which displays "OK" is pressed. The full-size scanning refers to scanning of the entire document platen. Here, an image in which the portion of the detachable pressing plate 450 is black and the other portion is white can be obtained by scanning by the scanner 150.

The calibration processing unit 1014 acquires the image information output by the scanner 150. The calibration processing unit 1014 binaries the acquired image information based on a threshold value. Here, a case of binarizing with white and black will be described. The calibration processing unit 1014 sets the smallest coordinate among lines of dots in which black is continued in the main scanning direction as a through-hole start position that is a position at which the through-hole is started.

In addition, if the line of the dots in which black is continued in the main scanning direction becomes a line of dots including black and white, and a line of dots in which white is continued, the calibration processing unit 1014 sets the largest coordinate among the lines of the dots including black and white as a through-hole end position that is a position at which the through-hole is ended.

The calibration processing unit 1014 outputs information indicating the through-hole start position and information indicating the through-hole end position to the setting unit 1011.

The setting unit 1011 derives the position of the portion exposed through the through-hole based on the information indicating the through-hole start position and the information indicating the through-hole end position output by the calibration processing unit 1014. The setting unit 1011 stores information indicating the derived position of the portion exposed through the through-hole.

The creating unit 1015 temporarily stores the image information output by the scanner control unit 1012. The creating unit 1015 processes each kind of the image information of the acquired images of the front and back sides of the ID card C when acquiring each kind of the image information of the images of the front and back sides of the ID card C output by the scanner control unit 1012. The creating unit 1015 creates images indicating the images of the front and back sides of the ID card C according to the information indicating the layout output by the layout determining unit 1013. The creating unit 1015 outputs the created image information of the image to the display 110.

The display 110 displays the image information output by the creating unit 1015. As a result, the image information indicating the images of the front and back sides of the ID card C are displayed on the display 110. The user presses the OK button when agreeing to the previewed images of the ID card C. When the user presses the OK button, the creating unit 1015 outputs the information indicating the previewed images of the front and back sides of the ID card C to the storage unit 105.

The communication I/F 104 is connected to the information processing unit 101. The communication I/F 104 is realized by a communication module. The communication I/F 104 performs communication with another device such as a terminal device 300 via a network 50.

The storage unit 105 is configured using a storage device such as a magnetic hard disk device or a semiconductor storage device. The storage unit 105 stores a program executed by the CPU 102 of the image forming apparatus 100. In addition, the storage unit 105 stores information of a user ID that permits use of the image forming apparatus 100, information in association with the user ID and the password that permits use of the image forming apparatus 100, or information indicating the previewed images of the front and back sides of the ID card C.

In addition, the image forming apparatus 100 is connected to the terminal device 300 via the network 50. The terminal device 300 may acquire and display the information indicating the previewed images of the front and back sides of the ID card C stored in the storage unit 105 of the image forming apparatus 100.

The print engine 106 acquires the image information indicating the images of the front and back sides of the ID card C stored in the storage unit 105 based on the printing job. The print engine 106 executes printing of the images of the front and back sides of the ID card C by processing the acquired image information indicating the images of the front and back sides of the ID card C.

First Example of Operation of Image Forming Apparatus

Figure 11:
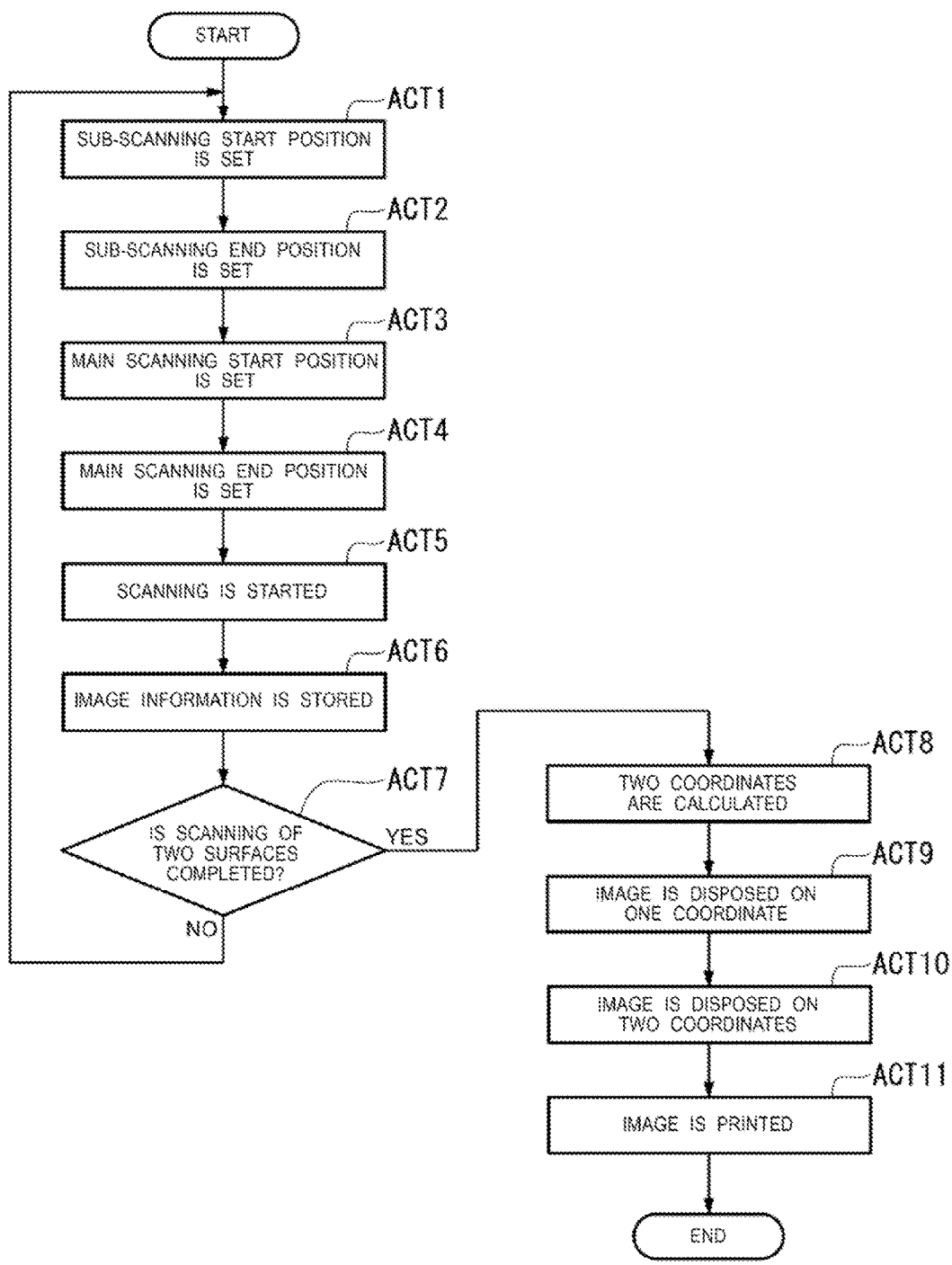
FIG. 11 is a flowchart of a first example of an operation of an image forming apparatus according to the embodiment.

Processing of the image forming apparatus 100 according to the embodiment will be described with reference to FIG. 11. FIG. 11 is a flow chart of a first example of an operation of the image forming apparatus according to the embodiment.

FIG. 11 illustrates an operation after the user presses an icon which displays the continuous mode on the display 110.

(ACT 1) The setting unit 1011 of the image forming apparatus 100 sets the sub-scanning start position SSSP.

(ACT 2) The setting unit 1011 of the image forming apparatus 100 sets the sub-scanning end position SSEP.

(ACT 3) The setting unit 1011 of the image forming apparatus 100 sets the main scanning start position MSSP.

(ACT 4) The setting unit 1011 of the image forming apparatus 100 sets the main scanning end position MSEP.

(ACT 5) The scanner control unit 1012 of the image forming apparatus 100 starts scanning an ID card C based on the sub-scanning start position SSSP, the sub-scanning end position SSEP, the main scanning start position MSSP, and the main scanning end position MSEP set by the setting unit 1011 by controlling the scanner 150. The scanner control unit 1012 acquires the image information of the ID card C output by the scanner 150 and outputs the acquired image information to the creating unit 1015.

(ACT 6) The creating unit 1015 of the image forming apparatus 100 acquires the image information of the ID card C output by the scanner control unit 1012 and stores the acquired image information of the ID card C.

(ACT 7) The creating unit 1015 of the image forming apparatus 100 determines whether or not the image information of both the front and back sides of the ID card C output by the scanner control unit 1012 has been acquired. If it is determined that the image information of the both sides of the ID card C has not been acquired, the procedure proceeds to ACT 1. If it is determined that the image information of the both sides of the ID card C has been acquired, the procedure proceeds to ACT 8. If the procedure proceeds to ACT 1, the image information of a side of the ID card C which has not been acquired is now acquired.

(ACT 8) The creating unit 1015 of the image forming apparatus 100 calculates two coordinates for disposing either sides of the ID card C based on the information indicating the layout output by the layout determining unit 1013. Specifically, the creating unit 1015 derives a first coordinate corresponding to a center of a region of a sheet in which the front side of the ID card C will printed, and a second coordinate corresponding to a center of a region of the sheet in which the back side of the ID card C will be printed.

(ACT 9) The creating unit 1015 of the image forming apparatus 100 locates the image of the front side of the ID card centered at the first coordinate.

(ACT 10) The creating unit 1015 of the image forming apparatus 100 locates the image of the back side of the ID card centered at the second coordinate.

(ACT 11) The creating unit 1015 of the image forming apparatus 100 outputs the image information of an image having the images of the front and back sides of the ID card C located at the first coordinate and the second coordinate, respectively, to the storage unit 105. The storage unit 105 stores the image information of the image having the images of the both sides of the ID card C output by the creating unit 1015. The print engine 106 performs printing by processing the image information of the image having the images of the both sides of the ID card C stored in the storage unit 105.

Second Example of Operation of Image Forming Apparatus

Figure 12:
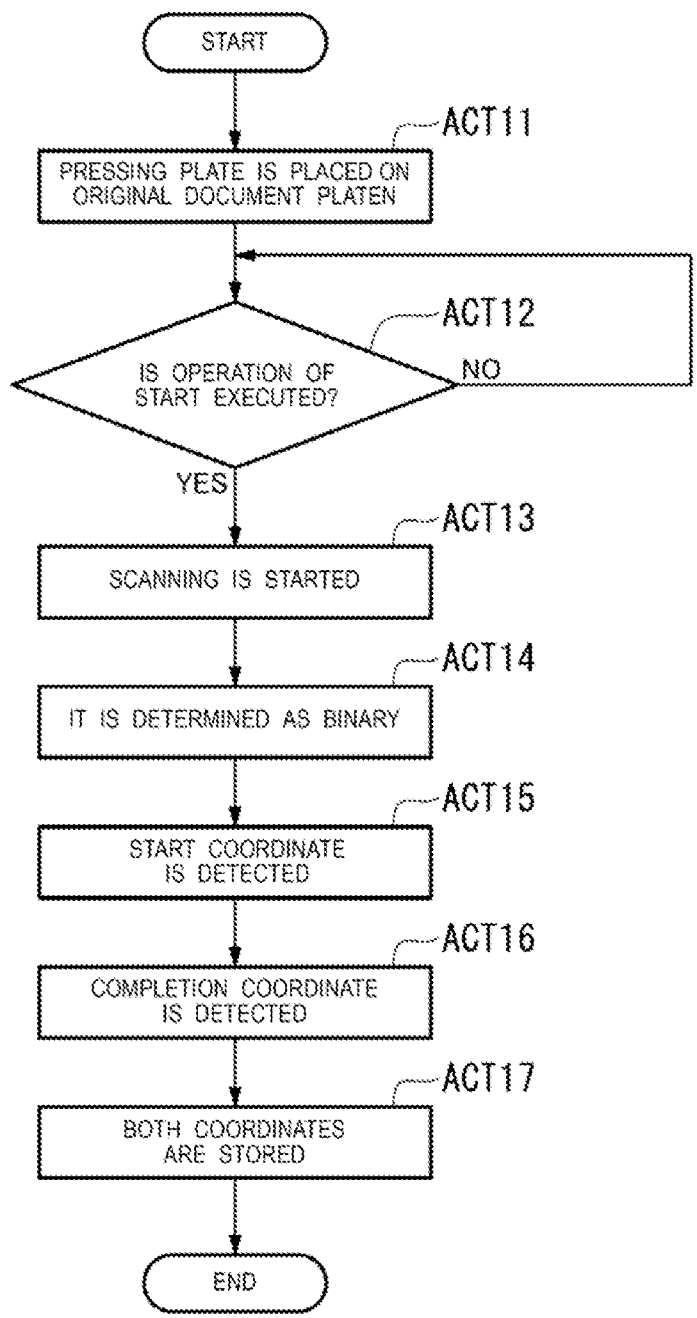
FIG. 12 is a flowchart of a second example of an operation of an image forming apparatus according to the embodiment.

Processing of the image forming apparatus 100 according to the embodiment will be described with reference to FIG. 12. FIG. 12 is a flow chart of a second example of an operation of the image forming apparatus according to the embodiment. FIG. 12 illustrates a process of calibrating the position of the through-hole with respect to the document platen performed by the image forming apparatus 100.

(ACT 11) The user places the white plate 430 on the document platen. Here, the detachable pressing plate 450 is detached from the white plate 430.

(ACT 12) The calibration processing unit 1014 of the image forming apparatus 100 determines whether or not an instruction for starting the calibration has been received from a user. Specifically, when an icon indicating calibration processing displayed on the display 110 is pressed, the calibration processing unit 1014 determines that the instruction for starting the calibration has been received. If the instruction for starting the calibration has not been received, the procedure returns to ACT 12.

(ACT 13) The scanner control unit 1012 of the image forming apparatus 100 causes the scanner 150 to execute the full-size scanning by controlling the scanner 150. The calibration processing unit 1014 acquires the image information output by the scanner 150.

(ACT 14) The calibration processing unit 1014 of the image forming apparatus 100 binaries the acquired image information based on the threshold value.

(ACT 15) The calibration processing unit 1014 of the image forming apparatus 100 sets the smallest coordinate among the lines of dots in which black is continued in the main scanning direction as the through-hole start position.

(ACT 16) If the line of the dots in which black is continued in the main scanning direction becomes the line of dots including black and white, and the line of dots in which white is continued, the calibration processing unit 1014 of the image forming apparatus 100 sets the largest coordinate among the lines of the dots including black and white as the through-hole end position.

(ACT 17) The calibration processing unit 1014 outputs the information indicating the through-hole start position and the information indicating the through-hole end position to the setting unit 1011.

The setting unit 1011 derives the position of the portion exposed through the through-hole based on the information indicating the through-hole start position and the information indicating the through-hole end position output by the calibration processing unit 1014. The setting unit 1011 stores the derived position of the portion exposed through the through-hole.

In the above-described embodiments, an example in which the images of the front and back sides of the ID card C are stored in the storage unit 105 of the image forming apparatus 100 is described, but the image forming apparatus 100 is not limited to this example. For example, the information indicating the images of the front and back sides of the ID card C may be stored in an external storage unit connected to the image forming apparatus 100 such as a Universal Serial Bus (USB) memory. The information may be output to the terminal device 300 connected to the network 50. In addition, the image forming apparatus 100 may print the images of the front and back sides of the ID card C by processing the image information indicating the images of the front and back sides of the ID card C.

In the above-described embodiments, the image forming apparatus 100 which stores the images of the front and back sides of the ID card C in the storage unit 105 and prints the stored images of the front and back sides of the ID card C is described, but the image forming apparatus 100 is not limited to this example. For example, a reading device may read images of front and back sides of the ID card C and the image forming apparatus 100 may store the images ready by the reading device in the storage unit 105.

In the above-described embodiments, an example in which each of the images of the front and back sides of the ID card C is disposed according to the layout selected by the user in the image forming apparatus 100, but the image forming apparatus 100 is not limited to this example. For example, the layout of the images of the front and back sides of the ID card C may be set in advance. In the image forming apparatus 100, the images of the front and back sides of the ID card C may be located according to the layout that is set in advance.

In the above-described embodiments, an example in which the calibration of the position of the portion exposed through the through-hole appearing on the document cover 400 is performed prior to the selection of the continuous mode and the copying of the ID card C by the user, but the image forming apparatus 100 is not limited to this example. For example, the calibration may be performed by an administrator of the image forming apparatus 100.

The image forming apparatus 100 according to the embodiment includes the document platen, the document cover 400 that can be placed on the document platen and has the rectangular through-hole into which the original document can be inserted, the scanner 150 that scans the original document inserted into the through-hole while the document cover 400 is placed on the document platen, and the print engine 106 that prints the image obtained by the scanner 150. With such a configuration, when the images of the front and back sides of the ID card C are being printed, since the ID card C is placed at the portion exposed through the through-hole, it is possible to prevent the ID card C from being shifted. Therefore, it is possible to prevent the images of the front and back sides of the ID card C from being shifted. In addition, since the document cover has the through-hole, it is possible to copy the images of the front and back sides of the ID card C continuously without opening and closing of the document cover. Therefore, it is possible to reduce the work of the user when copying the images of the front and back sides of the ID card C.

In addition, a document cover 400 having different sized through-holes can be placed on the document platen according to the types of the original document being processed. With such a configuration, it is possible to copy the images of the front and back sides of the ID card C of different sizes. Therefore, it is possible to reduce the work of the user when copying the images of the front and back sides of the ID card C.

The image forming apparatus 100 according to the embodiment includes the setting unit 1011 which acquires the scanned image reading position depending on the size of the through-hole and setting the acquired scanned image reading position and the scanner 150 that scans the card according to the scanned image reading position set by the setting unit 1011. With such a configuration, the scanned image reading position can be set so that the image information of the shadow of the through-hole or the image information of black streak is not included.

The setting unit 1011 acquires sub-scanned image reading position and the main scanned image reading position, and sets sub-scanned image reading position and the main scanned image reading position which are acquired. The scanner 150 scans the card according to the sub-scanned image reading position and the main scanned image reading position set by the setting unit 1011. With such a configuration, the scanned image reading position can be set so that the image information of the shadow of the through-hole or the image information of black streak is not included.

The setting unit 1011 acquires the position within the length of the through-hole in the sub-scanning direction as the sub-scanned image reading position, and acquires the position within the length of the through-hole in the main scanning direction as the main scanned image reading position. With such a configuration, the sub-scanned image reading position can be set so that the image information of the shadow of the through-hole or the image information of black streak in the sub-scanning direction is not included.

The image forming apparatus 100 according to the embodiment includes the calibration processing unit 1014 that derives the position of the portion exposed through the through-hole by scanning the through-hole while the document cover 400 is placed on the document platen. With such a configuration, even if some misalignment occurs depending on a dimensional error of a component or the position of the white plate 430 placed by the user on the document platen, it is still possible to calibrate the position of the portion exposed through the through-hole.

The image forming apparatus 100 according to the embodiment includes the layout determining unit that determines the layout of images of front and back sides of the card C scanned by the scanner 150. With such a configuration, it is possible to dispose the images of the front and back sides of the ID card C according to the layout of the images of the front and back sides of the ID card C according to the layout selected by the user among a plurality of the layouts.

The image forming apparatus 100 according to the embodiment includes the storage unit 105 that stores image information of the front and back sides of the ID card C disposed according to the layout determined by the layout determining unit 1013 and the scanner 150 that scans the card according to the scanned image reading position set by the setting unit 1011. With such a configuration, if the image information of the front and back sides of the ID card C is further required, it is possible to create the images of the front and back sides of the ID card C by using the stored image information without creating a new layout.

The reading device according to the embodiment includes the document platen, the document cover 400 that can be placed on the document platen and has the rectangular through-hole into which the original document can be inserted, and the scanner 150 that scans the original document inserted into the through-hole while the document cover 400 is placed on the document platen. With such a configuration, when printing the images of the front and back sides of the ID card C, since the ID card C is placed at the portion exposed through the through-hole, it is possible to prevent the ID card C from being shifted. Therefore, it is possible to prevent the images of the front and back sides of the ID card C from being shifted. In addition, since the document cover has the through-hole, it is possible to continuously scan the images of the front and back sides of the ID card C without opening and closing of the document cover. Therefore, it is possible to reduce the work of the user when scanning the images of the front and back sides of the ID card C.

Each of above-described devices incorporates a computer device therein. The processing by each of the above-described devices is performed according to a program non-transiently stored in a computer-readable recording medium. The program can be read and executed by a computer and thereby the computer performs the described processing. In addition, the computer program may be distributed to a computer through a communication line and the computer receiving the distribution may execute the program. The program may be for realizing a part or all of the above-described functions.

The computer program may be a "difference file" also referred to as a differential program, which can realize the above-described functions by a combination with a program already recorded in a computer system.

In the above-described embodiments, the ID card C is an example of a card type medium and the print engine 106 is an example of the printing unit.

While certain embodiments have been described these embodiments have been presented by way of example only, and are not intended to limit the scope of the inventions. Indeed, the novel embodiments described herein may be embodied in a variety of other forms. Furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An image forming apparatus, comprising:
a document platen;
a document cover for covering the document platen during scanning, the document cover having a through-hole into which an original document is insertable for placement on the document platen for scanning while the document cover is at a closed position covering the document platen, the document cover contacting the document platen when at the closed position;
a scanner that moves along the document platen to scan the original document on the document platen to obtain image data corresponding to the original document;
a printing unit that prints an image of the original document corresponding to the image data obtained by the scanner; and a controller that acquires a scanned image reading position from the scanner and then adjusts the scanned image reading position according to a predetermined size of the through-hole.

2. The apparatus according to claim 1, wherein the document cover further comprises a plurality of through-holes having different sizes, the different sized through-holes in the plurality corresponding to different types of original documents.

3. The apparatus according to claim 1, wherein
the controller acquires a sub-scanning image reading position and a main scanning image reading position, and
the scanner is configured to scan the original document according to the sub-scanning image reading position and the main scanning image reading position.

4. The apparatus according to claim 3, wherein
the sub-scanning position is at a position position within a perimeter of the through-hole, and
the main-scanning position is at a position within the perimeter of the through-hole.

5. The apparatus according to claim 1, wherein, the controller detects a position of a portion of the document platen left exposed by the through-hole based on image data from the scanner obtained with the document cover on the document platen at the closed position.

6. The apparatus according to claim 1, wherein the controller further selects layout positions on the document platen corresponding to through-hole positions in the document cover at which images of a front side of the original document and a back side of the original document are scanned by the scanner.

7. The apparatus according to claim 6, further comprising:
a storage unit that stores image data of the images of the front and back sides of the original document according to the selected layout positions, wherein
the printing unit prints images corresponding to the front and back sides of the original document based on the image data stored in the storage unit.

8. A reading device, comprising:
a document platen;
a document cover for covering the document platen during scanning, the document cover having a through-hole into which an original document is insertable for placement on the document platen for scanning while the document cover is at a closed position covering the document platen;
a scanner that moves along the document platen to scan the original document on the original document platen to image data corresponding to the original document; and
a controller that acquires a scanned image reading position from the scanner and then adjusts the scanned image reading position according to a predetermined size of the through-hole.

9. The device according to claim 8, wherein the document cover further comprises a plurality of through-holes having different sizes, the different sized through-holes in the plurality corresponding to different types of original documents.

10. The device according to claim 8, wherein
the controller acquires a sub-scanning image reading position and a main scanning image reading position, and
the scanner is configured to scan the original document according to the sub-scanning image reading position and the main scanning image reading position.

11. The device according to claim 10, wherein
the sub-scanning position is at a positon position within a perimeter of the through-hole, and
the main-scanning position is at a position within the perimeter of the through-hole.

12. The device according to claim 8, wherein the controller detects a position of a portion of the document platen left exposed by the through-hole based on image data from the scanner obtained with the document cover on the document platen at the closed position.

13. The device according to claim 8, wherein the controller further selects layout positions on the document platen corresponding through-hole positions in the document cover at which images of a front side of the original document and a back side of the original document are scanned by the scanner.

14. The device according to claim 13, further comprising:
a storage unit that stores image data of the images of the front and back sides of the original document according to the selected layout positions; and
a printing unit that prints an image of the original document corresponding to the image data obtained by the scanner, wherein
the printing unit prints images corresponding to the front and back sides of the original document based on the image data stored in the storage unit.

15. A document scanning method, comprising:
covering a document platen of an image forming apparatus with a document cover having a first through-hole corresponding in shape and size to an original document;
placing the original document on the document platen without removing the document cover from the document platen by inserting the original document in the first through-hole while the document cover is at a closed position at which the document cover is in contact with the document platen;
scanning, by moving a scanner sensor in a sub-scanning direction, the original document placed on the document platen while the document cover is at the closed position to obtain image data corresponding to the original document; and
acquiring a scanned image reading position from the scanner sensor and then adjusting the scanned image reading position according to a predetermined size of the through-hole.

16. The method of claim 15, further comprising:
printing an image of the original document corresponding to the image data obtained by the scanning.

17. The method of claim 15, wherein
the document cover includes a second through-hole corresponding in shape and size to the original document, and
the method further comprises:
removing the original document from the document platen through the first through-hole without removing the document cover from the document platen; and
placing the original document on the document platen without removing the document cover from the document platen by inserting the original document in the second through-hole.

18. The method of claim 15, wherein the document cover includes a second through-hole corresponding in shape and size to a different type of original document than the first though-hole.

* * * * *